(12) United States Patent
Cho et al.

(10) Patent No.: US 12,505,770 B2
(45) Date of Patent: Dec. 23, 2025

(54) FOLDABLE DISPLAY DEVICE

(71) Applicant: LG DISPLAY CO., LTD., Seoul (KR)

(72) Inventors: SeongTae Cho, Goyang-si (KR);
Rakhee Park, Changwon-si (KR);
KyungSeok Kim, Paju-si (KR);
Hyunyoung Lee, Gyeongsan-si (KR)

( * ) Notice: Subject to any disclaimer, the term of this patent is extended or adjusted under 35 U.S.C. 154(b) by 11 days.

(21) Appl. No.: 18/426,890

(22) Filed: Jan. 30, 2024

(65) Prior Publication Data

US 2024/0257682 A1    Aug. 1, 2024

(30) Foreign Application Priority Data

Jan. 31, 2023 (KR) .................. 10-2023-0013287

(51) Int. Cl.
| | |
|---|---|
| G09G 3/00 | (2006.01) |
| G06F 3/041 | (2006.01) |
| G09G 3/3225 | (2016.01) |
| H10K 59/40 | (2023.01) |
| H10K 59/80 | (2023.01) |
| H10K 102/00 | (2023.01) |

(52) U.S. Cl.
CPC .......... *G09G 3/035* (2020.08); *G06F 3/0412* (2013.01); *G06F 3/04164* (2019.05); *G09G 3/3225* (2013.01); *H10K 59/40* (2023.02); *H10K 59/873* (2023.02); *G09G 2300/0408* (2013.01); *G09G 2300/0842* (2013.01); *G09G 2354/00* (2013.01); *H10K 2102/311* (2023.02)

(58) Field of Classification Search
None
See application file for complete search history.

(56) References Cited

U.S. PATENT DOCUMENTS

2023/0147566 A1*  5/2023  Hong .................. H10K 50/844
                                                              345/173

FOREIGN PATENT DOCUMENTS

| KR | 10-2022-0058720 A | 5/2022 |
|---|---|---|
| KR | 10-2413395 B1 | 6/2022 |

* cited by examiner

*Primary Examiner* — Ifedayo B Iluyomade

(57) ABSTRACT

A foldable display device includes a substrate including a display area including a folding area and a non-display area surrounding the display area and including a bending area and a pad area; a pixel circuit unit disposed on the substrate in the display area; an encapsulation portion disposed on the pixel circuit unit; a touch sensing unit disposed on the encapsulation portion and including touch electrodes; a plurality of lines disposed on the bending area; and an antistatic member disposed in the bending area and including the same material as the touch electrodes.

21 Claims, 6 Drawing Sheets

FOLDABLE DISPLAY DEVICE

CROSS-REFERENCE TO RELATED APPLICATION

This application claims the priority of Korean Patent Application No. 10-2023-0013287 filed on Jan. 31, 2023, which is hereby incorporated by reference in its entirety.

BACKGROUND

Field of the Disclosure

The present disclosure relates to a foldable display device, and more specifically, to a foldable display device capable of protecting components from external static electricity introduced into the device during a bending operation.

Description of the Background

A foldable display device may be implemented as an organic light emitting display device (OLED). Unlike a liquid crystal display device (LCD) that has a backlight, the organic light emitting display device does not require a separate light source. Therefore, it may be manufactured in a lightweight and thin form, has process advantages, and is advantageous in terms of low power consumption due to a low voltage operation. Above all, the organic light emitting display device includes a self-light emitting element, and each layer thereof may be formed of an organic thin film. Thus, the organic light emitting display device has superior flexibility and elasticity compared to other display devices and accordingly, is more advantageous to be implemented as a foldable display device.

Generally, to protect a foldable display device from external impacts, the foldable display device may include a housing. That is, the housing may be a component of the foldable display device that includes a display panel and surrounding components thereof. That is, in the display device, the display panel and surrounding components thereof may be included within the housing.

However, during a foldable operation (changing between a bending state and an unfolding state), a sliding phenomenon may occur in a cover window of the foldable display device, so the cover window is not attached to the housing and the cover window and the housing may be separated by a certain distance. However, there occurs a defect in which external static electricity introduces into the foldable display device through the space between the cover window and the housing.

SUMMARY

Accordingly, the present disclosure is directed to a foldable display device that substantially obviates one or more of problems due to limitations and disadvantages described above.

More specifically, the present disclosure is to provide a foldable display device to prevent or minimize electric impacts due to external static electricity introduced into a space between a housing and a cover window.

Additional features and advantages of the disclosure will be set forth in the description which follows and in part will be apparent from the description, or may be learned by practice of the disclosure. Other advantages of the present disclosure will be realized and attained by the structure particularly pointed out in the written description and claims hereof as well as the appended drawings.

The present disclosure is not limited to the above-mentioned, and other features, which are not mentioned above, may be clearly understood by those skilled in the art from the following descriptions.

To achieve these and other advantages and in accordance with the present disclosure, as embodied and broadly described, a foldable display device according to an exemplary aspect of the present disclosure includes a substrate including a display area including a folding area and a non-display area extending from at least one side of the display area and including a bending area and a pad area; a pixel circuit unit disposed on the substrate in the display area; an encapsulation portion disposed on the pixel circuit unit; a touch sensing unit disposed on the encapsulation portion and including touch electrodes; a plurality of lines disposed in the bending area; and an antistatic member disposed in the bending area and including the same material as the touch electrodes.

Other detailed matters of the exemplary aspects are included in the detailed description and the drawings.

According to the present disclosure, it is possible to prevent or minimize electric impacts due to external static electricity introduced into a space between a housing and a cover window.

The effects according to the present disclosure are not limited to the contents exemplified above, and more various effects are included in the present disclosure.

BRIEF DESCRIPTION OF THE DRAWINGS

The accompanying drawings, which are included to provide a further understanding of the disclosure and are incorporated in and constitute a part of the disclosure, illustrate aspects of the disclosure and together with the description serve to explain the principle of the disclosure.

In the drawings.

DETAILED DESCRIPTION

Figure 1:
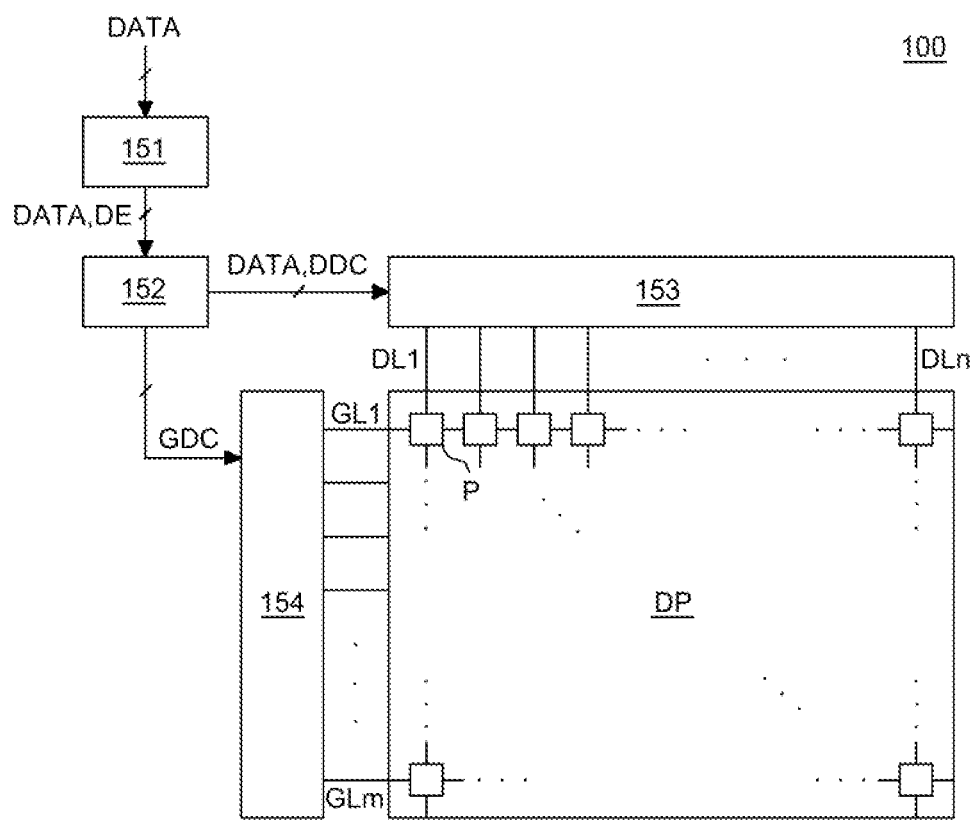
FIG. 1 is a block diagram of a foldable display device according to an exemplary aspect of the present disclosure.

Advantages and characteristics of the present disclosure and a method of achieving the advantages and characteristics will be clear by referring to exemplary aspects described below in detail together with the accompanying drawings. However, the present disclosure is not limited to the exemplary aspects disclosed herein but will be implemented in various forms. The exemplary aspects are provided by way of example only so that those skilled in the art may fully understand the disclosures of the present disclosure and the scope of the present disclosure.

The shapes, sizes, ratios, angles, numbers, and the like illustrated in the accompanying drawings for describing the exemplary aspects of the present disclosure are merely examples, and the present disclosure is not limited thereto. Like reference numerals generally denote like elements throughout the specification. Further, in the following description of the present disclosure, a detailed explanation of known related technologies may be omitted to avoid unnecessarily obscuring the subject matter of the present disclosure. The terms such as "including," "having," and "consist of" used herein are generally intended to allow other components to be added unless the terms are used with the term "only." Any references to singular may include plural unless expressly stated otherwise.

Components are interpreted to include an ordinary error range even if not expressly stated.

When the position relation between two parts is described using the terms such as "on," "above," "below," and "next," one or more parts may be positioned between the two parts unless the terms are used with the term "immediately" or "directly."

When an element or layer is disposed "on" another element or layer, another layer or another element may be interposed directly on the other element or therebetween.

Although the terms "first," "second," and the like are used for describing various components, these components are not confined by these terms. These terms are merely used for distinguishing one component from the other components. Therefore, a first component to be mentioned below may be a second component in a technical concept of the present disclosure.

Like reference numerals generally denote like elements throughout the specification.

A size and a thickness of each component illustrated in the drawing are illustrated for convenience of description, and the present disclosure is not limited to the size and the thickness of the component illustrated.

The features of various aspects of the present disclosure may be partially or entirely adhered to or combined with each other and may be interlocked and operated in technically various ways, and the aspects may be carried out independently of or in association with each other.

Hereinafter, a foldable display device according to exemplary aspects of the present disclosure will be described in detail with reference to accompanying drawings.

FIG. 1 is a block diagram of a foldable display device according to an exemplary aspect of the present disclosure.

Referring to FIG. 1, a foldable display device 100 according to an exemplary aspect of the present disclosure may include an image processor 151, a timing controller 152, a data driver 153, a gate driver 154, and a display area unit DP.

In this case, the image processor 151 may output a data signal DATA and a data enable signal DE supplied from the outside. The image processor 151 may output one or more of a vertical synchronization signal, a horizontal synchronization signal, and a clock signal in addition to the data enable signal DE.

The timing controller 152 is supplied with the data enable signal DE or driving signals including a vertical synchronization signal, a horizontal synchronization signal, and a clock signal, as well as the data signal DATA from the image processor 151. The timing controller 152 may output a gate timing control signal GDC for controlling an operation timing of the gate driver 154 and a data timing control signal DDC for controlling an operation timing of the data driver 153 based on the driving signal.

In addition, the data driver 153 samples and latches the data signal DATA supplied from the timing controller 152 in response to the data timing control signal DDC supplied from the timing controller 152 and may convert the data signal into a gamma reference voltage and output it. The data driver 153 may output the data signal DATA through data lines DL1 to DLn.

Additionally, the gate driver 154 may output a gate signal while shifting a level of a gate voltage in response to the gate timing control signal GDC supplied from the timing controller 152. The gate driver 154 may output gate signals through gate lines GL1 to GLm.

The display area unit DP may display an image as sub-pixels P emit light in response to the data signal DATA and the gate signal supplied from the data driver 153 and the gate driver 154.

Figure 2:
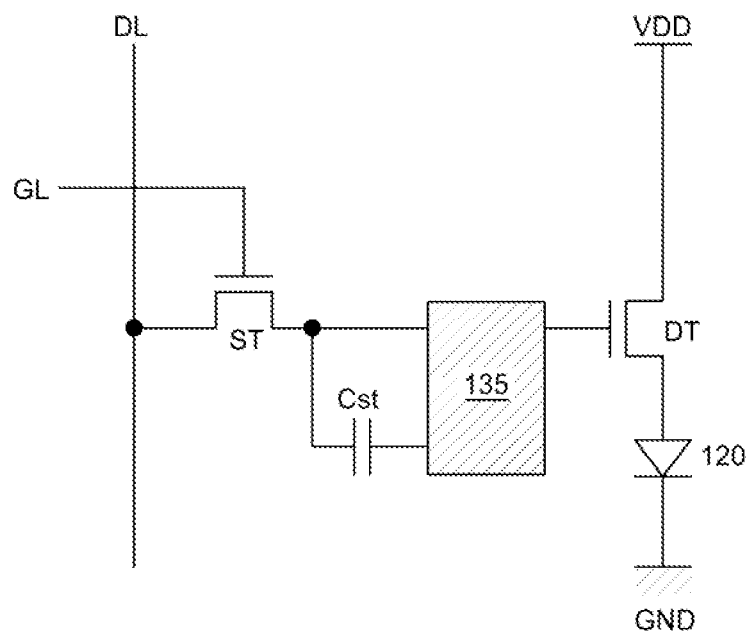
FIG. 2 is a circuit diagram of a sub-pixel of the foldable display device according to an exemplary aspect of the present disclosure.

FIG. 2 is a circuit diagram of a sub-pixel of the foldable display device according to an exemplary aspect of the present disclosure.

Referring to FIG. 2, the sub-pixel of the foldable display device 100 according to an exemplary aspect of the present disclosure may include a switching thin film transistor ST, a driving thin film transistor DT, a compensation circuit 135, and a light emitting element.

The light emitting element may operate to emit light according to a driving current that is formed by the driving thin film transistor DT.

The switching thin film transistor ST may perform a switching operation so that the data signal supplied through the data line DL is stored as a data voltage in a capacitor Cst in response to the gate signal that is supplied through the gate line GL.

The driving thin film transistor DT may operate so that a constant driving current flows between a high-potential power supply line VDD and a low-potential power supply line GND in response to the data voltage stored in the capacitor Cst.

The compensation circuit 135 is a circuit for compensating a threshold voltage of the driving thin film transistor DT, and the compensation circuit 135 may include one or more thin film transistors and a capacitor. A configuration of the compensation circuit 135 may vary greatly depending on a compensation method.

The sub-pixel shown in FIG. 2 is configured to have a 2T (transistor) 1C (capacitor) structure including the switching thin film transistor ST, the driving thin film transistor DT, the capacitor Cst, and a light emitting element, but when the compensation circuit 135 is added, it may be configured in various manners, such as 3T1C, 4T2C, 5T2C, 6T1C, 6T2C, 7T1C, 7T2C, and the like.

Figure 3:
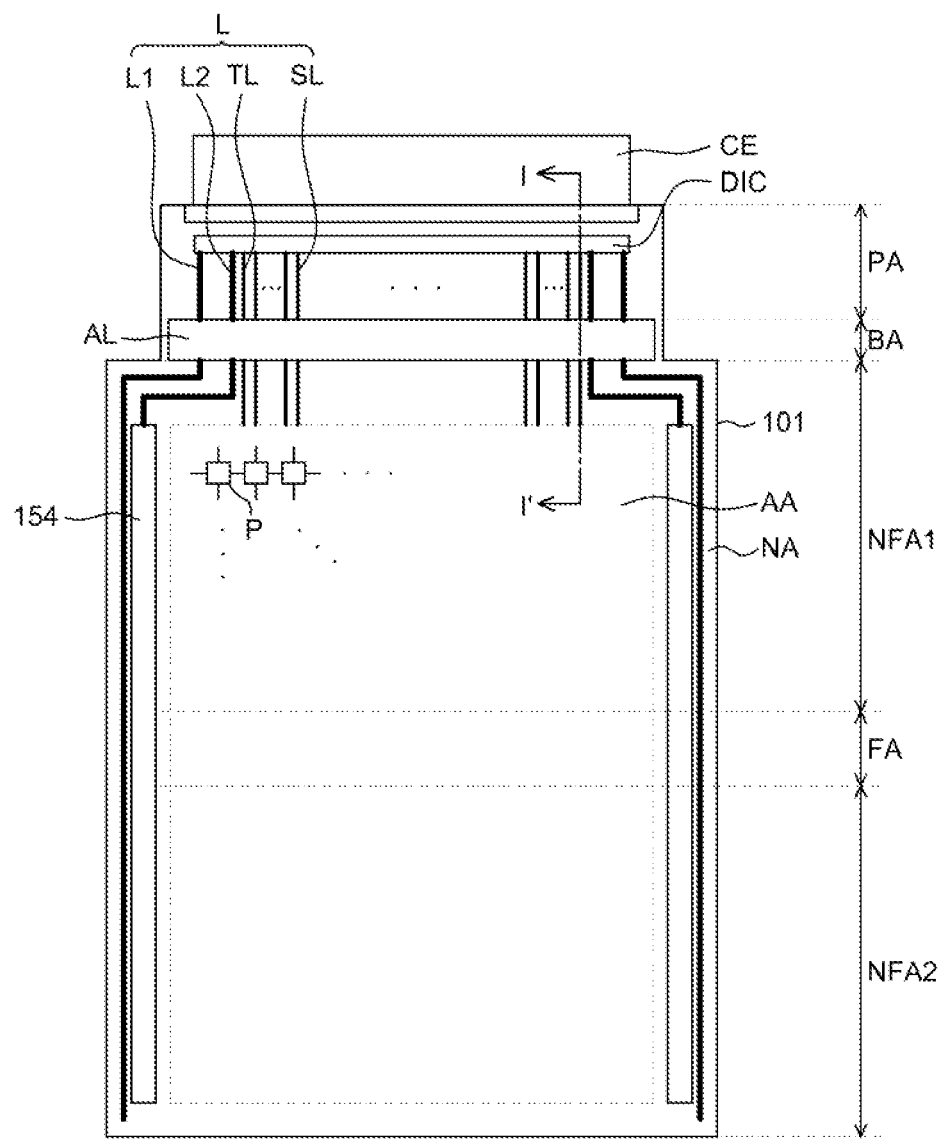
FIG. 3 is a plan view of the foldable display device according to an exemplary aspect of the present disclosure.

FIG. 3 is a plan view of the foldable display device according to an exemplary aspect of the present disclosure.

FIG. 3 shows, for example, a state in which a substrate 101 of the foldable display device 100 according to an exemplary aspect of the present disclosure is not bent.

In FIG. 3, for convenience of explanation, only the substrate 101, the gate driver 154, a circuit element, and a plurality of lines are shown among various components of the foldable display device 100.

The substrate 101 is a component to support various components included in the foldable display device 100, and may be formed of an insulating material. The substrate 101 may be formed of a flexible material that may be bent. The substrate 101 may be formed of a transparent insulating material. For example, the substrate 101 may be formed of a plastic material such as polyimide (PI).

The substrate 101 may be divided into a folding area FA and non-folding areas NFA1 and NFA2 depending on whether or not it is folded. Specifically, the substrate 101 may include a folding area FA, a first non-folding area NFA1 disposed on one side with respect to the folding area FA, and a second non-folding area NFA2 disposed on the other side with respect to the folding area FA. That is, the folding area FA may be disposed between the first non-folding area NFA1 and the second non-folding area NFA2. The folding area FA is an area that is folded when folding the foldable display device 100, and may be folded along a specific radius of curvature with respect to the folding axis. The non-folding areas NFA1 and NFA2 are areas that are not folded when the foldable display device 100 is folded. That is, the non-folding areas NFA1 and NFA2 maintain a flat state when folding the foldable display device 100. The non-folding areas NFA1 and NFA2 may extend from both sides of the folding area FA along a folding direction.

Additionally, the substrate 101 may be divided into a display area AA and a non-display area NA depending on whether or not an image is displayed.

The display area AA is an area where a plurality of the pixels P are disposed to actually display an image. In the display area AA, the plurality of pixels P including emission areas for displaying an image and thin film transistors and capacitors for driving the pixels may be disposed. One pixel may include a plurality of sub-pixels. The sub-pixels are minimum units constituting the display area, and each of the sub-pixels may be configured to emit light in a specific wavelength band. For example, each of the sub-pixels may be configured to emit red, green, blue, or white light.

A display unit (CA in FIGS. 4 and 5, hereinafter, the same) including the light emitting element for displaying an image may be formed in the display area AA. For example, when the foldable display device 100 is an organic light emitting display device, the display unit CA may include an organic light emitting element. That is, the organic light emitting element may include an anode, an organic light emitting layer on the anode, and a cathode on the organic light emitting layer. The organic light emitting layer may be formed of, for example, a hole transport layer, a hole injection layer, an organic light emitting layer, an electron injection layer, and an electron transport layer. However, when the foldable display device 100 is a liquid crystal display device, the display unit CA may be configured to include a liquid crystal layer. Hereinafter, for convenience of explanation, descriptions are made assuming that the foldable display device 100 is an organic light emitting display device, but the present disclosure is not limited thereto.

Additionally, the display unit CA may include various thin film transistors, capacitors, and lines for driving the light emitting element. For example, the display unit CA may be formed of various components such as a driving transistor, a switching transistor, a storage capacitor, gate lines, and data lines, but is not limited thereto.

The non-display area NA is an area where images are not substantially displayed, and various lines and circuits such as the gate driver 154 for driving the display unit CA disposed in the display area AA may be disposed in the non-display area NA. As shown in FIG. 3, the non-display area NA may be defined as an area surrounding the display area AA. However, it is not limited thereto and the non-display area NA may be defined as an area extending from one side of the display area AA. Additionally, the non-display area NA may be defined as extending from a plurality of sides of the display area AA.

The non-display area NA on at least one side of the display area AA includes a bending area BA and a pad area PA. The display area AA may be located on one side of the bending area BA, and the pad area PA may be located on the other side of the bending area BA. The bending area BA is an area that is bent based on a virtual bending axis in the substrate 101. The bending area BA is an area where the substrate 101 is bent in the non-display area AA and may be distinguished from the folding area FA where a portion of the display area AA is folded.

Specifically, in this disclosure, the substrate 101 may be divided into the display area AA and the non-display area NA depending on whether an image is displayed, and may be divided into the folding area FA and the non-folding areas NFA1 and NFA2 depending on whether it is folded. Accordingly, one portion of the substrate 101 may be the display area AA and at the same time, may be the folding area FA, and other portions of the substrate 101 may be the non-display area NA and at the same time, may be the non-folding areas NFA1 and NFA2. That is, the display area AA of the substrate 101 may be defined as including the folding area FA and the non-folding areas NFA1 and NFA2. Unlike this, the bending area BA is included in the non-display area NA.

Therefore, in this disclosure, a state in which the substrate 101 is bent or folded in the folding area FA is described as folding, and a state in which the bending area BA included in the non-display area NA is bent or folded is described as bending.

In an exemplary aspect, division of the areas of the substrate 101 is illustrative, and the substrate 101 may be divided into a plurality of areas (for example, four or more or two areas) according to a structure or function thereof.

The pad area PA may be formed to receive external power and data driving signals, or to exchange touch signals.

A driving circuit unit DIC may be located in the pad area PA.

Additionally, a circuit element CE disposed in a direction of an outer area of the substrate 101 compared to the driving circuit unit DIC may be disposed in the pad area PA. For example, the circuit element CE may be a flexible printed circuit, but is not limited thereto.

The driving circuit unit DIC disposed in the pad area PA may be connected to a plurality of lines L. Since the plurality of lines L extend from the display area AA to the pad area PA, they may also be disposed on the bending area BA.

The plurality of lines may include a first line L1, a second line L2, a touch line TL, and a signal line SL. The first line may be a ground line. The first line L1 may be disposed on the substrate 101 in the non-display area NA. The first line L1 may be disposed along the display area AA in the non-display area NA. The first line L1 extends to the pad area PA through the bending area BA and thus, may be connected to the driving circuit unit DIC.

The driving circuit unit DIC disposed in the pad area PA may be connected to the gate driver 154 through the second line L2. The driving circuit unit DIC disposed in the pad area PA is connected to the second line L2 and may be connected to a plurality of the data lines or a plurality of the gate lines disposed in the display area AA while passing through the gate driver 154 through the second line L2. Accordingly, a driving signal from the driving circuit unit DIC disposed in the pad area PA may be applied to each of the plurality of pixels P.

The signal line SL is a line arranged from the driving circuit unit DIC to the display area AA and transmitting various signals to the display unit CA of the display area AA. For example, the signal line SL may be a data connection line that transmits a data signal to the data line DL.

The touch line TL is a line arranged from the driving circuit unit DIC to the display area AA and transmitting various signals to a touch sensing unit TS of the display area AA. For example, the touch line TL may be a touch connection line that transmits a touch signal to a touch electrode. Meanwhile, as will be described later in FIG. 4, the touch line TL may include a first touch line (TL1 in FIGS. 4 and 5, hereinafter the same) and a second touch line (TL2 in FIGS. 4 and 5, hereinafter the same).

Meanwhile, the bending area BA in which a portion of the non-display area NA is bent in one direction may be located between the display area AA and the pad area PA in the non-display area NA.

Since the non-display area NA is not an area where an image is displayed, it is unnecessary to be visible from an upper surface of the substrate 101. Accordingly, the non-display area NA may be reduced while securing an area for the lines and driving circuit by bending a portion of the non-display area NA of the substrate 101.

For example, in the display device according to an exemplary aspect of the present disclosure, a lower edge of the substrate 101 may be bent in a rear direction to have a predetermined curvature.

The lower edge of the substrate 101 may correspond to an outside of the display area AA and may correspond to an area where the driving circuit unit DIC and the pad area PA are located. As the substrate 101 is bent, the driving circuit unit DIC and the pad area PA may be located to overlap the display area AA in a rear direction of the display area AA. Accordingly, a bezel area that is recognized from a front surface of the foldable display device 100 may be minimized. Accordingly, a bezel width may be reduced and an aesthetic sense may be improved.

An antistatic member AL may be disposed in the bending area BA of the substrate 101. The antistatic member AL may cover the bending area BA in a plan view. The antistatic member AL may be bent together with bending of the bending area BA.

The antistatic member AL may maintain a floating state in which an electrical signal is supplied or not supplied. Additionally, the antistatic member AL may be electrically connected to the first line L1, which is a ground line. The antistatic member AL may transmit externally generated static electricity to a ground terminal through the first line L1 which is a ground line and protect components of the foldable display device 100 from the external static electricity. The ground terminal may be a terminal that is included in the driving circuit unit DIC and grounded to an outside of the foldable display device 100.

Figure 4:
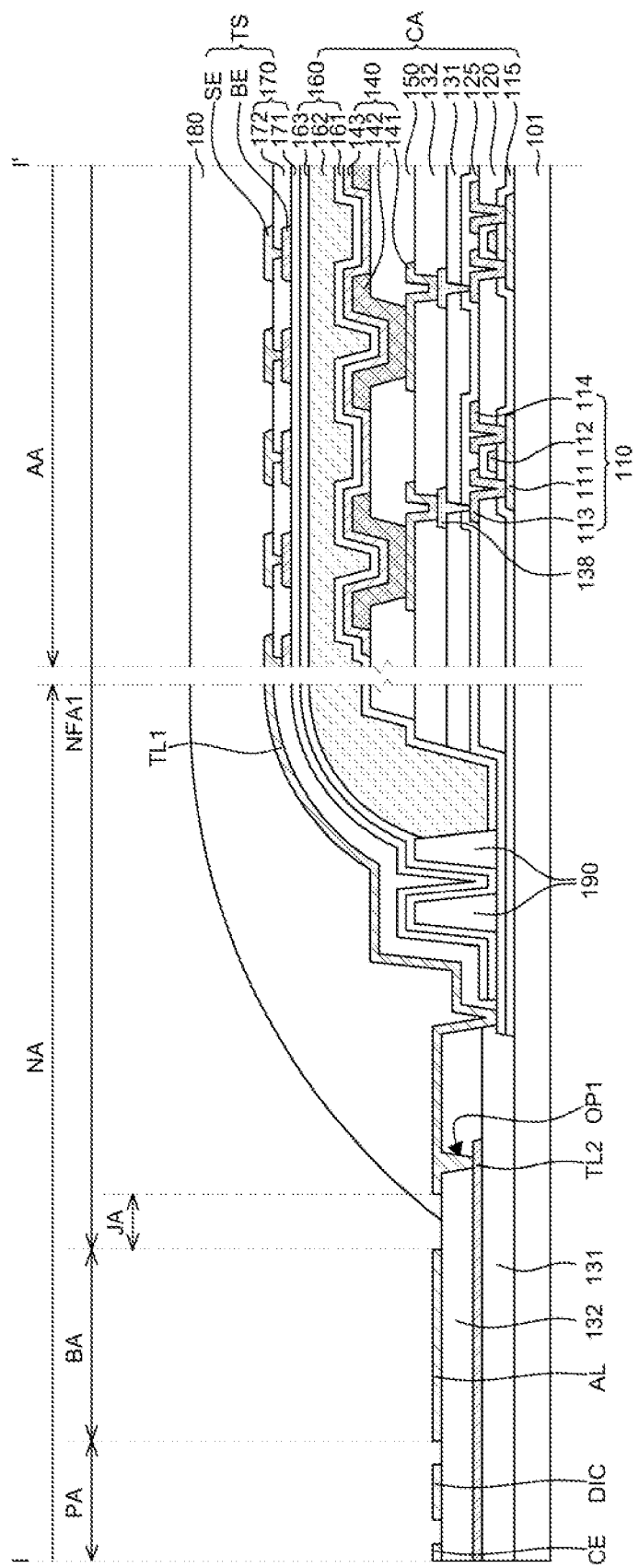
FIG. 4 is an example of a schematic cross-sectional view taken along line I-I' of FIG. 3.

FIG. 4 is an example of a schematic cross-sectional view taken along line I-I' of FIG. 3.

A thin film transistor 110 that drives each pixel is disposed in the display area AA of the substrate 101. The thin film transistor 110 includes an active layer 111, a gate electrode 112, a source electrode 113, and a drain electrode 114.

The active layer 111 is disposed on the substrate 101. The active layer 111 may be formed of polysilicon (p-Si), amorphous silicon (a-Si), or an oxide semiconductor, but is not limited thereto.

A gate insulating layer 115 is disposed on the substrate 101 and the active layer 111. The gate insulating layer 115 may be formed of silicon oxide (SiOx), silicon nitride (SiNx), or a multilayer thereof.

The gate electrode 112 is disposed on the gate insulating layer 115. The gate electrode 112 is disposed on the gate insulating layer 115 to overlap the active layer 111. The gate electrode 112 may be formed of various conductive materials, such as magnesium (Mg), aluminum (AL), nickel (Ni), chromium (Cr), molybdenum (Mo), tungsten (W), gold (Au), or an alloy thereof, but is not limited thereto.

An interlayer insulating layer 120 is disposed on the gate insulating layer 115 and the gate electrode 112. The interlayer insulating layer 120 may be formed of silicon oxide (SiOx), silicon nitride (SiNx), or a combination thereof.

The source electrode 113 and the drain electrode 114 are disposed on the interlayer insulating layer 120. The source electrode 113 and the drain electrode 114 are electrically connected to the active layer 111 through contact holes formed in the gate insulating layer 115 and the interlayer insulating layer 120. The source electrode 113 and the drain electrode 114 may be formed of various conductive materials, such as magnesium (Mg), aluminum (AL), nickel (Ni), chromium (Cr), molybdenum (Mo), tungsten (W), gold (Au) or an alloy thereof, but are not limited thereto.

A passivation layer 125 may be disposed on the source electrode 113 and the drain electrode 114 to insulate the thin film transistor 110. The passivation layer 125 may be formed of inorganic material, for example, silicon oxide (SiOx), silicon nitride (SiNx), or a combination thereof.

A first planarization layer 131 is disposed on the passivation layer 125. The first planarization layer 131 protects the thin film transistor 110 and planarizes an upper portion of the thin film transistor 110. The first planarization layer 131 may be formed of, for example, an organic insulating film such as benzocyclobutene (BCB) and acryl, but is not limited thereto.

A connection electrode 138 is disposed on the first planarization layer 131. The connection electrode 138 may be electrically connected to the source electrode 113 or the drain electrode 114 through a through hole included in the first planarization layer 131. The connection electrode 138 may be formed of various conductive materials, such as magnesium (Mg), aluminum (AL), nickel (Ni), chromium (Cr), molybdenum (Mo), tungsten (W), gold (Au) or an alloy thereof, but are not limited thereto. The connection electrode 138 may include the same material as the source electrode 113 or the drain electrode 114.

A second planarization layer 132 is disposed on the connection electrode 138. The second planarization layer 132 protects the connection electrode 138 and planarizes an upper portion thereof. The second planarization layer 132 may be formed of, for example, an organic insulating film such as benzocyclobutene (BCB) or acryl, but is not limited thereto. The second planarization layer 132 may include the same material as the first planarization layer 131.

A light emitting element 140 is disposed on the second planarization layer 132. The light emitting element 140 includes an anode 141, an organic light emitting layer 142, and a cathode 143.

The anode 141 is formed on the second planarization layer 132 to correspond to the emission area of each pixel P. The anode 141 may be electrically connected to the drain electrode 114 of the thin film transistor 110 through contact holes of the first planarization layer 131 and the second planarization layer 132. The anode 141 may be formed of a metallic material.

When the display device 100 is a top emission type in which light emitted from the light emitting element 140 is emitted upwardly of the substrate 101 on which the light emitting element 140 is placed, the anode 141 may further include a transparent conductive layer and a reflective layer on the transparent conductive layer. The transparent conductive layer may be formed of, for example, a transparent conductive oxide such as ITO and IZO, and the reflective layer may be formed of, for example, silver (Ag), aluminum (AL), gold (Au), molybdenum (Mo), tungsten (W), chromium (Cr), or an alloy thereof.

A bank layer 150 is formed in a remaining area excluding the emission area. Accordingly, the bank layer 150 may expose the anode 141 corresponding to the emission area. The bank layer 150 may be formed of an inorganic insulating material such as silicon nitride (SiNx) or silicon oxide (SiOx), or an organic insulating material such as benzocyclobutene-based resin, acrylic resin, or imide-based resin, but is not limited thereto.

A spacer may be further formed on the bank layer 150. The spacer may be formed of the same material as the bank layer 150. The spacer may function to protect damage to the light emitting element 140, which may be caused by a fine metal mask (FMM) used when patterning the organic light emitting layer 142.

The organic light emitting layer 142 is disposed on the anode 141 that is exposed by the bank layer 150. The organic light emitting layer 142 may include a hole injection layer, a hole transport layer, a light emitting layer, an electron transport layer, an electron injection layer, and the like. The organic light emitting layer 142 may be configured as a single light emitting layer structure that emits one light, or may be configured as a plurality of light emitting layers that emit white light.

The cathode 143 is disposed on the organic light emitting layer 142. Since the cathode 143 supplies electrons to the organic light emitting layer 142, it may be formed of a conductive material with a low work function. The cathode 143 may be formed as one layer throughout the plurality of sub-pixels P. That is, the cathodes 143 of each of the plurality of sub-pixels P may be connected to each other and formed integrally.

Hereinafter, in this disclosure, among components disposed between the substrate 101 and an encapsulation portion 160, components disposed in the display area AA may be collectively defined as the display unit CA. That is, the display unit CA may include the thin film transistor 110, the gate insulating layer 115, the interlayer insulating layer 120, the passivation layer 125, a planarization layer 130, the light emitting element 140, and the bank layer 150. The display unit CA may further include a spacer. That is, the display unit CA may be disposed on the substrate 101 in the display area AA.

The encapsulation portion 160 may be disposed on the display unit CA. Specifically, the encapsulation portion 160 is disposed on the cathode 143. The encapsulation portion 160 may protect the light emitting element 140 from moisture and oxygen. When the light emitting element 140 is exposed to moisture or oxygen, a pixel shrinkage phenomenon in which the light emitting element 140 shrinks may occur, or dark spots may occur in the emission area.

For example, the encapsulation portion 160 may include a first inorganic encapsulation layer 161, an organic encapsulation layer 162 on the first inorganic encapsulation layer 161, and a second inorganic encapsulation layer 163 on the organic encapsulation layer 162. The first inorganic encapsulation layer 161 and the second inorganic encapsulation layer 163 may be formed of an inorganic insulating layer. For example, the first inorganic encapsulation layer 161 and the second inorganic encapsulation layer 163 may be formed of an inorganic insulating material such as silicon nitride (SiNx), silicon oxide (SiOx), silicon oxynitride (SiON), and aluminum oxide ($Al_2O_3$). The organic encapsulation layer 162 may be formed of an organic insulating layer. For example, the organic encapsulation layer 162 may include acrylic resin or epoxy resin. The second inorganic encapsulation layer 163 may cover an upper surface and side surfaces of each of the first inorganic encapsulation layer 161 and the organic encapsulation layer 162, and the second inorganic encapsulation layer 163 may minimize or block penetration of external moisture or oxygen into the first inorganic encapsulation layer 161 and the organic encapsulation layer 162. In this case, the first inorganic encapsulation layer 161 and the second inorganic encapsulation layer 163 serve to block the penetration of moisture or oxygen, and the organic encapsulation layer 162 serves to planarize an upper portion of the first inorganic encapsulation layer 161. However, a configuration of the encapsulation portion 160 is not limited thereto.

In the non-display area NA, dam portions 190 that block a flow of the organic encapsulation layer 162 constituting the encapsulation portion 160 may be disposed. Specifically, the dam portions 190 are disposed in a shape of a closed curve surrounding the display area AA in the non-display area NA. The second inorganic encapsulation layer 163 is disposed on the dam portions 190, and the flow of the organic encapsulation layer 162 may be blocked by the dam portions 190. The dam portion 190 should have a certain height to block the flow of the organic encapsulation layer 162. To this end, the dam portion 190 may be composed of at least one layer formed of an organic material. For example, the dam portion 190 may include a lower layer formed of the same material as the planarization layer 130 and an upper layer formed of the same material as the bank layer 150, but is not limited thereto. Although two dam portions 190 are configured in the drawing, one dam portion 190 or three or more dam portions 190 may be provided.

A touch sensing unit TS including a plurality of touch electrodes may be disposed on the encapsulation portion 160. The plurality of touch electrodes may include bridge electrodes BE and sensing electrodes SE that are disposed in different layers. Specifically, the touch sensing unit TS may include a touch buffer layer 171 disposed on the encapsulation portion 160, the bridge electrodes BE disposed on the touch buffer layer 171, a touch interlayer insulating layer 172 disposed on the touch buffer layer 171 and the bridge electrodes BE, and the sensing electrodes SE disposed on the touch interlayer insulating layer 172. In this case, the bridge electrode BE and the sensing electrode SE may include the same material.

The touch buffer layer 171 may be formed to cover the dam portions 190 disposed in the non-display area NA. The touch buffer layer 171 may block a chemical solution such as a developer or etchant that is used during a manufacturing process of the touch electrodes formed on the touch buffer layer 171, or external moisture or foreign materials from penetrating into the light emitting element.

The bridge electrodes BE are disposed on the touch buffer layer 171. The bridge electrodes BE are disposed in the display area AA and electrically connect the sensing electrodes SE on the touch interlayer insulating layer 172. In this case, contact holes may be formed to penetrate the touch interlayer insulating layer 172. The bridge electrode BE is disposed below the touch interlayer insulating layer 172 and exposed through the contact hole.

The touch interlayer insulating layer 172 may be disposed on the touch buffer layer 171 to cover the bridge electrodes BE and may insulate the bridge electrodes BE and the sensing electrodes SE. Additionally, the touch interlayer insulating layer 172 may be disposed between the bridge electrodes BE to insulate the bridge electrodes BE from each other.

The touch interlayer insulating layer 172 is formed to extend not only to the display area AA but also to the non-display area NA. The touch interlayer insulating layer 172 may be formed to cover the dam portions 190 and reduce steps caused by the dam portions 190.

Hereinafter, in this disclosure, a touch insulating layer 170 including the touch buffer layer 171 and the touch interlayer insulating layer 172 may be disclosed. That is, the touch insulating layer 170 is included in the touch sensing unit TS, and for convenience of explanation, the touch insulating layer 170 may be defined as a configuration including the touch buffer layer 171 and the touch interlayer insulating layer 172.

The touch insulating layer 170 may be formed of at least one material among an inorganic insulating material such as silicon nitride (SiNx) or silicon oxide (SiOx) and an organic insulating material such as benzocyclobutene (BCB), acrylic resin, epoxy resin, phenolic resin, polyamide resin, or polyimide resin, but is not limited thereto.

The sensing electrode SE may be formed of a metal containing at least one of titanium (Ti), aluminum AL, molybdenum (Mo), moly titanium (MoTi), copper (Cu), and tantalum (Ta), and may be formed of a transparent conductive material such as indium tin oxide (ITO) or indium zinc oxide (IZO), but is not limited thereto. Light emitted from the foldable display device 100 may pass through the sensing electrode SE formed of a transparent conductive material and be emitted to the outside. However, the present disclosure is not limited thereto, and light emitted from the foldable display device 100 may be emitted to the outside through a plurality of openings (not shown) included in the sensing electrodes SE.

Meanwhile, the first touch line TL1 may be disposed in the non-display area NA. The first touch line TL1 is disposed on the touch insulating layer 170 and may extend from the non-display area NA toward the bending area BA.

The first touch line TL1 may be electrically connected to the touch sensing unit TS. In this case, the first touch line TL1 may include the same material as the touch electrode of the touch sensing unit TS. For example, the first touch line TL1 may be formed of the same material as the sensing electrode SE. The first touch line TL1 may receive a touch sensing signal from the touch sensing unit TS and transmit the touch sensing signal to the driving circuit unit DIC through the second touch line TL2, which will be described later.

The first touch line TL1 may be disposed on the dam portions 190 and may cover at least a portion of the dam portion 190. At a point where the touch insulating layer 170 terminates, the first touch line TL1 may be disposed on an upper surface of the second planarization layer 132. That is, the second planarization layer 132 may be disposed below the touch insulating layer 170, and the first touch line TL1 may contact a portion of the upper surface of the second planarization layer 132 at the point where the touch insulating layer 170 terminates.

Meanwhile, the second touch line TL2 may be disposed in the non-display area NA, and the first touch line TL1 that electrically connects the second touch line TL2 and the sensing electrode SE may be disposed on the touch interlayer insulating layer 172. The second touch line TL2 may be electrically connected to the driving circuit unit DIC to transmit the touch sensing signal that is detected by the sensing electrode SE to the driving circuit unit DIC. The second touch line TL2 may be formed on the same layer and formed of the same material as the connection electrode 138. That is, the second touch line TL2 electrically connects the first touch line TL1 and the driving circuit unit DIC, and may be disposed between the first planarization layer 131 and the second planarization layer 132.

The first planarization layer 131 and the second planarization layer 132 may be disposed on the substrate 101 throughout the non-display area NA and the display area AA.

In the non-display area NA, the second planarization layer 132 may include a first opening OP1 through which the first touch line TL1 and the second touch line TL2 contact each other. That is, the second planarization layer 132 may include the first opening OP1 connecting the first touch line TL1 and the second touch line TL2. The first touch line TL1 and the second touch line TL2 may directly contact or be electrically connected through the first opening OP1 of the second planarization layer 132.

The antistatic member AL may be disposed on the second planarization layer 132 in the bending area BA. In this case, the antistatic member AL is disposed on the same layer as the first touch line TL1 and may include the same material as the first touch line TL1. The antistatic member AL may be spaced apart from or insulated from the first touch line TL1. Since the first touch line TL1 may include the same material as the touch electrode of the touch sensing unit TS described above, the antistatic member AL may include the same material as the touch electrode of the touch sensing unit TS. In some cases, the antistatic member AL, the first touch line TL1, and the touch electrode of the touch sensing unit TS may include the same material, may have the same layer structure, and may be formed simultaneously through the same process.

As an example, the antistatic member AL, the first touch line TL1, and the sensing electrode SE of the touch sensing unit TS may be formed of a low-resistance metal material, and may also be formed of a transparent conductive material such as ITO, IZO or the like, but are not limited thereto. For example, if the first touch line TL1 is formed of a low-resistance metal material, resistance thereof may be lowered and an RC delay may be reduced.

For example, when a touch sensing signal is detected by the sensing electrode SE included in the touch sensing unit TS, the touch sensing signal may be transmitted to the driving circuit unit DIC through the first touch line TL1 and the second touch line TL2.

When viewed in a direction perpendicular to the substrate 101 (or in a plan view), the antistatic member AL and the first touch line TL1 may be spaced apart by a jump area JA. That is, the antistatic member AL may be spaced apart or insulated from the first touch line TL1 by a predetermined distance. Since external static electricity passes through the antistatic member AL, if the antistatic member AL and the first touch line TL1 are electrically connected, there may occur a defect in which the external static electricity is transmitted to the driving circuit unit DIC through the first touch line TL1 and the second touch line TL2.

A protective layer 180 may be disposed on the touch sensing unit TS. The protective layer 180 may serve to prevent oxidation, corrosion, or damage to the touch sensing unit TS. The protective layer 180 may cover the touch sensing unit TS. The protective layer 180 may overlap the touch sensing unit TS when viewed in the direction perpendicular to the substrate 101

The protective layer 180 may be formed of at least one material among an inorganic insulating material such as silicon nitride (SiNx) or silicon oxide (SiOx) and an organic insulating material such as benzocyclobutene (BCB), acrylic resin, epoxy resin, phenolic resin, polyamide resin, or polyimide resin, but is not limited thereto.

The protective layer 180 is disposed on the first touch line TL1 in the non-display area NA and may cover the first touch line TL1. The protective layer 180 is disposed on the first opening OP1 included in the second planarization layer 132 and may overlap the first opening OP1 when viewed in the direction perpendicular to the substrate.

Additionally, in some cases, the protective layer 180 may cover a portion of the upper surface of the second planarization layer 132 exposed to the outside in the jump area JA described above.

Figure 5:
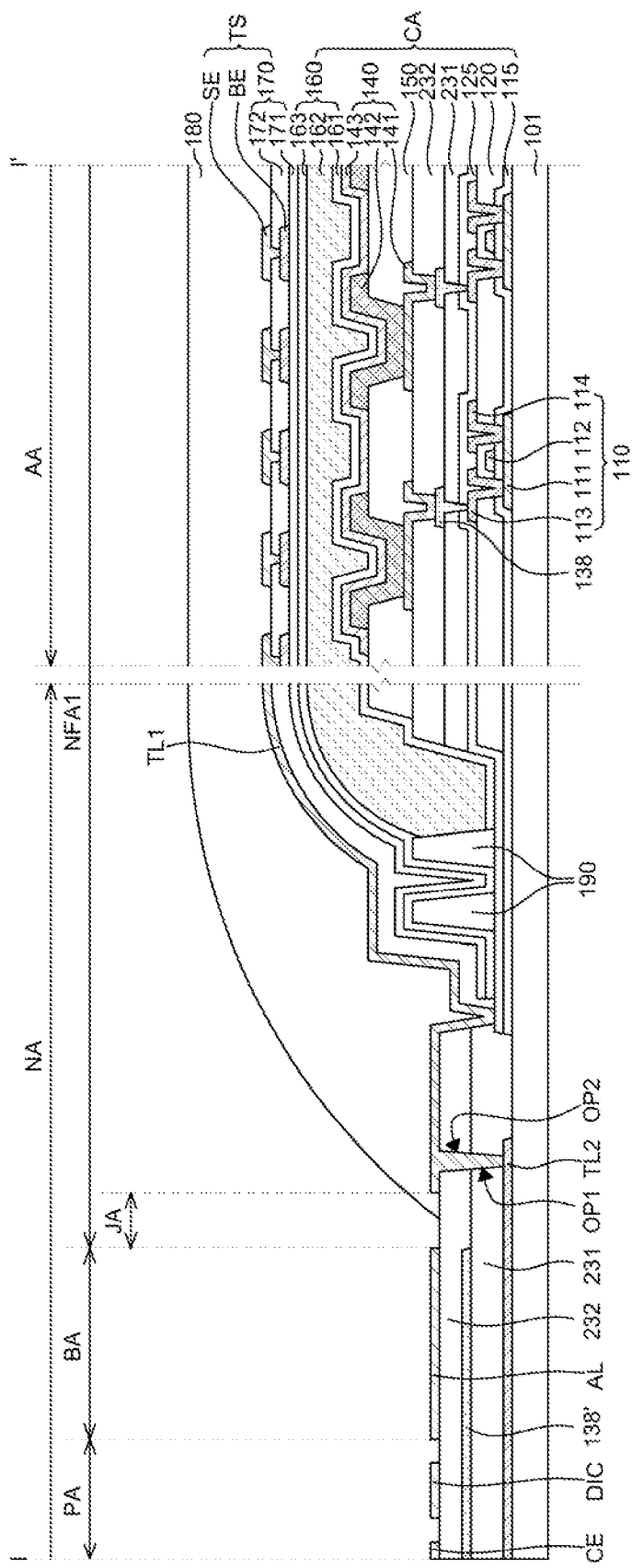
FIG. 5 is another example of a schematic cross-sectional view taken along line I-I' of FIG. 3.

FIG. 5 is another example of a schematic cross-sectional view taken along line I-I' of FIG. 3.

For reference, in descriptions of components shown in FIG. 5, content that is the same as or overlaps with the content described above may be omitted.

Referring to FIG. 5, unlike a structure shown in FIG. 4, the second touch line TL2 is disposed below a first planarization layer 231. Referring to FIG. 5, the second touch line TL2 is disposed directly on the substrate 101 in at least a portion of the non-display area NA, and is disposed between the substrate 101 and the first planarization layer 231. In this case, the second touch line TL2 may be formed on the same layer and formed of the same material as the source electrode 113 and the drain electrode 114. That is, the second touch line TL2 electrically connects the first touch line TL1 and the driving circuit unit DIC.

In this case, the first planarization layer 231 may include a first opening OP1 connecting the first touch line TL1 and the second touch line TL2 in the non-display area NA adjacent to the bending area BA. In addition, the second planarization layer 232 may include a second opening OP2 connecting the first touch line TL1 and the second touch line, which corresponds to the first opening OP1 of the first planarization layer 231. An inner surface of the first opening OP1 and an inner surface of the second opening OP2 may form a continuous surface. That is, the second opening OP2 and the first opening OP1 may be combined to function as one opening. That is, the first touch line TL1 and the second touch line TL2 may directly contact or be electrically connected through the first opening OP1 and the second opening OP2.

In addition, unlike the structure shown in FIG. 4, an intermediate line 138' may be disposed between the first planarization layer 231 and the second planarization layer 232 in the bending area BA and the pad area PA.

Specifically, the intermediate line 138' is disposed on the same layer and may include the same material as the connection electrode 138. The intermediate line 138' may overlap the antistatic member AL in the bending area BA when viewed in the direction perpendicular to the substrate. The intermediate line 138' may extend from the pad area PA to the bending area BA.

Although not shown in FIG. 5, the intermediate line 138' may be electrically connected to the second touch line TL2 through a through hole formed in the first planarization layer 231, or may be electrically connected to the driving circuit unit DIC or the antistatic member AL through a through hole formed in the second planarization layer 232. The intermediate line 138' may be electrically connected to the driving circuit unit DIC and may transmit an electrical signal to the display area AA.

Referring to FIG. 5, the antistatic member AL may be disposed on the second planarization layer 232 and partially overlap the second touch line TL2 located therebelow. A description of the antistatic member AL may be omitted since it is identical to or overlaps with the content described above in connection with FIGS. 1 to 4.

Figure 6:
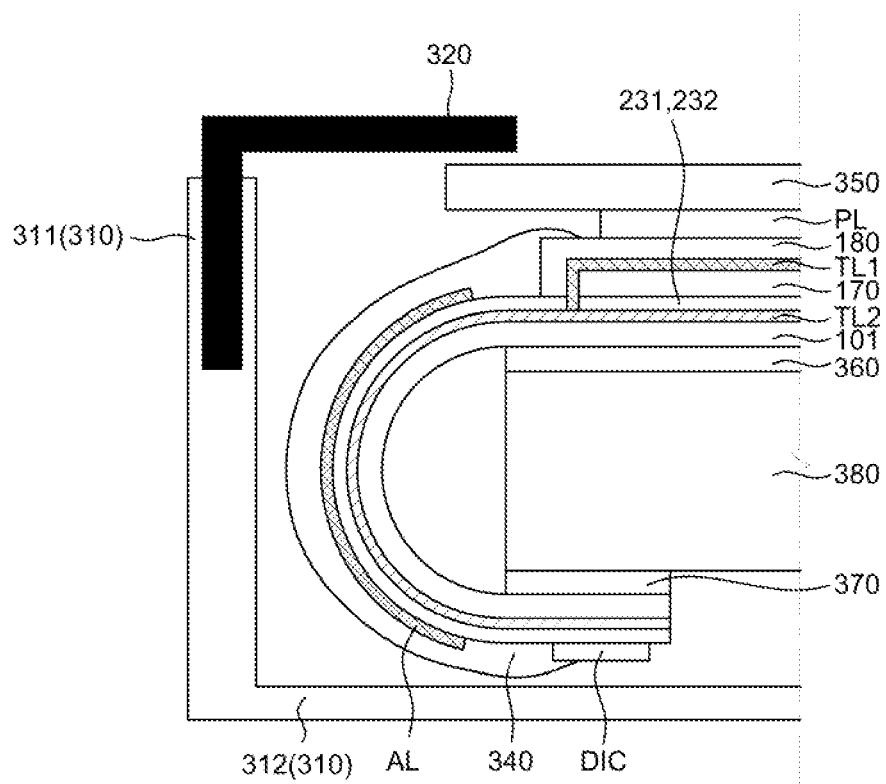
FIG. 6 is a cross-sectional view of the foldable display device including a housing according to an exemplary aspect of the present disclosure.

FIG. 6 is a cross-sectional view of the foldable display device including a housing according to an exemplary aspect of the present disclosure. In descriptions of components shown in FIG. 6, content that is the same or overlaps with the content described above may be omitted.

Referring to FIG. 6, the foldable display device 100 according to an exemplary aspect of the present disclosure may further include a micro-coating layer 340 disposed on the antistatic member AL in the bending area BA.

Since the inorganic insulating layers are etched from the bending area BA of the foldable display device 100, the plurality of lines L in the bending area BA may be vulnerable to moisture and other foreign materials. In particular, various pads and conductive lines L may be chamfered to test the components during manufacturing of the foldable display device 100, which results conductive lines leaving from notched edges of the foldable display device 100. These conductive lines may be easily corroded by moisture and also cause other adjacent conductive lines to corrode.

Accordingly, a protective coating layer, which may be referred to as a "micro-coating layer" may be formed on the plurality of lines L of the bending area BA of the foldable display device 100 to provide additional protection against moisture and other foreign materials.

In addition to having excellent moisture resistance, the micro-coating layer 340 should have sufficient flexibility so that it may be used in the bending area BA of the foldable display device 100. Additionally, a material of the micro-coating layer 340 may be a material that is curable with low energy in a limited time so that components under the micro-coating layer 340 are not damaged during a curing process.

As an example, the micro-coating layer 340 may be provided as a photo-curable (e. g., UV light, visible light, UV LED) resin and may be coated on targeted areas of the foldable display device 100. In light of this, the micro-coating layer 340 may be coated on an area between the encapsulation portion 160 and the driving circuit unit DIC that is attached to the non-display area. However, depending on adhesive properties of the micro-coating layer 340, the micro-coating layer 340 may be detachable from the encapsulation portion 160 and/or the driving circuit unit DIC. Any open space between the micro-coating layer 340 and the encapsulation portion 160 or the driving circuit part DIC may be a defect site through which moisture may penetrate.

The micro-coating layer 340 may cover the antistatic member AL. The micro-coating layer 340 may cover the substrate 101 in the bending area BA. The micro-coating layer 340 may cover an end of the first touch line TL1. The micro-coating layer 340 may cover a portion of the driving circuit unit DIC.

Referring to FIG. 6, the foldable display device 100 may further include a cover window 350 disposed on the touch sensing unit TS at least in the display area AA. The foldable display device 100 may include the cover window 350 as a protective layer.

When viewed from the direction perpendicular to the substrate 101 in an unfolded state, an area of the cover window 350 may be larger than an area of the display area AA.

Referring to FIG. 6, the foldable display device 100 may include a housing structure 310 and a housing decoration 320. The housing structure 310 may include a sidewall 311 that covers the bending area BA in a bent state. Additionally, the housing structure 310 may include a lower plate 312 that covers a lower portion of the substrate 101. The sidewall 311 may be spaced apart from the antistatic member AL.

The housing decoration 320 extends from the sidewall 311 and may cover an edge of the cover window 350 in a plan view. A portion of the housing decoration 320 may extend in a direction parallel to the cover window 350 to cover a portion of edges of an upper surface of the cover window 350. When a folding operation of the foldable display device 100 is performed, the cover window 350 may slide, and to this end, the upper surface of the cover window 350 and the housing decoration 320 may be spaced apart from each other. Additionally, the sidewall 311 may be spaced apart from the antistatic member AL.

However, as the upper surface of the cover window 350 and the housing decoration 320 are spaced apart in such a manner, external static electricity may be introduced into the display device through the space. Therefore, it is necessary to prevent external static electricity from being transmitted to other lines or the driving circuit unit DIC through the antistatic member AL connected to the ground electrode.

Referring to FIG. 6, a first support member 360 and a second support member 370 that contact a lower surface of the substrate 101 and support the substrate 101 are disclosed. The first support member 360 may support the lower surface of the substrate 101 at a location corresponding to the display area, and the second support member 370 may support the lower surface of the substrate 101 at a location corresponding to the pad area. The bending area BA is located and bent between the first support member 360 and the second support member 370. As the bending area BA is bent, the first support member 360 and the second support member 370 may be disposed to face each other. The first support member 360 and the second support member 370 may be bonded to a polymer member 380. Although not shown in FIG. 6, to bond respective layers, an adhesive layer may be disposed between the respective layers.

Referring to FIG. 6, a polarizing layer PL may be disposed below the cover window 350. The polarizing layer PL may transmit only light vibrating in the same direction as a polarization axis among light emitted from the display unit CA, and absorb or reflect light vibrating in other directions. The polarizing layer PL may include a retardation film that changes linearly polarized light into circularly polarized light or circularly polarized light into linearly polarized light by giving a phase difference of X to two polarization components perpendicular to each other, a polarizing film that may align a direction of light passing through the retardation film, divide it into two orthogonal polarization components, and allow only one component to pass therethrough while allowing the other component to be absorbed or dispersed. In some cases, the polarizing layer PL may be omitted.

The exemplary aspects of the present disclosure may also be described as follows:

According to an aspect of the present disclosure, there is provided a foldable display device. The foldable display device comprises a substrate including a display area including a folding area and a non-display area extending from at least one side of the display area and including a bending area and a pad area; a pixel circuit unit disposed on the substrate in the display area; an encapsulation portion disposed on the pixel circuit unit; a touch sensing unit disposed on the encapsulation portion and including touch electrodes; a plurality of lines disposed on the bending area; and an antistatic member disposed in the bending area and including the same material as the touch electrodes.

The foldable display device may further comprise a ground line disposed along the display area in the non-display area. The antistatic member may be connected to the ground line.

The touch electrodes may include a bridge electrode and a sensing electrode. The touch sensing unit may include a touch buffer layer disposed on the encapsulation portion; the bridge electrode disposed on the touch buffer layer; a touch interlayer insulating layer disposed on the bridge electrode; and the sensing electrode disposed on the touch interlayer insulating layer.

The antistatic member may include the same material as the sensing electrode.

The foldable display device may further comprise a driving circuit unit disposed on the substrate in the pad area and connected to the ground line; and a first touch line electrically connecting the touch sensing unit and the driving circuit unit.

The first touch line may be disposed on the touch buffer layer and the touch interlayer insulating layer in the non-display area.

The first touch line may include the same material as the sensing electrode.

The pixel circuit unit may include a thin film transistor disposed on the substrate; a passivation layer disposed on the substrate and covering the thin film transistor in the display area; and a first planarization layer disposed on the passivation layer in the display area.

The first planarization layer may extend to the bending area. The foldable display device may further include a second touch line electrically connected to the first touch line and disposed between the substrate and the first planarization layer in the bending area.

The foldable display device may further comprise a second planarization layer disposed on the first planarization layer in the display area and the bending area. The antistatic member may be disposed on the second planarization layer.

The first planarization layer may include a first opening connecting the first touch line and the second touch line. The second planarization layer may include a second opening overlapping the first opening. The first touch line and the second touch line may be in direct contact through the first opening and the second opening.

The thin film transistor may include an active layer disposed on the substrate; a gate electrode disposed on the active layer and insulated from the active layer; a source electrode and a drain electrode connected to the gate electrode. The second touch line may include the same material as the source electrode and the drain electrode.

The foldable display device may further comprise a connection electrode disposed between the first planarization layer and the second planarization layer in the display area and connected to a drain electrode of the thin film transistor; and an intermediate line disposed between the first planarization layer and the second planarization layer in the bending area and formed of the same material as the connection electrode.

The foldable display device may further comprise a micro-coating layer disposed on the antistatic member in the bending area.

The foldable display device may further comprise a cover window disposed on the touch sensing unit in the display area.

The foldable display device may further comprise a housing structure including a sidewall covering the bending area of the substrate in a state where the bending area is bent; and a housing decoration extending from the sidewall, covering an edge of the cover window in a plan view, and spaced apart from an edge of the cover window.

The sidewall may be spaced apart from the antistatic member.

The foldable display device may further comprise a protective layer covering the touch sensing unit in the display area and covering the first touch line in the non-display area.

The foldable display device may further comprise a protective layer disposed on the second planarization layer and overlapping the second opening when viewed in a direction perpendicular to the substrate.

The micro-coating layer may cover an end of the first touch line.

Although the exemplary aspects of the present disclosure have been described in detail with reference to the accompanying drawings, the present disclosure is not limited thereto and may be embodied in many different forms without departing from the technical concept of the present disclosure. Therefore, the exemplary aspects of the present disclosure are provided for illustrative purposes only but not intended to limit the technical concept of the present disclosure. The scope of the technical concept of the present disclosure is not limited thereto. Therefore, it should be understood that the above-described exemplary aspects are illustrative in all aspects and do not limit the present disclosure. The protective scope of the present disclosure should be construed based on the following claims, and all the technical concepts in the equivalent scope thereof should be construed as falling within the scope of the present disclosure.

What is claimed is:

1. A foldable display device, comprising:
   a substrate including a display area including a folding area and a non-display area extending from at least one side of the display area and including a bending area and a pad area;
   a pixel circuit unit disposed on the substrate in the display area;
   an encapsulation portion disposed on the pixel circuit unit;
   a touch sensing unit disposed on the encapsulation portion and including a plurality of touch electrodes;
   a plurality of lines disposed in the bending area; and
   an antistatic member disposed in the bending area and including a same material as the touch electrodes,
   wherein the pixel circuit unit includes:
   a thin film transistor disposed on the substrate;
   a passivation layer disposed on the substrate and covering the thin film transistor in the display area;
   a first planarization layer disposed on the passivation layer in the display area and extending to the bending area; and
   a second planarization layer disposed on the first planarization layer in the display area and the bending area,
   wherein the plurality of lines is disposed below the second planarization layer, and
   the antistatic member is disposed on the second planarization layer to overlap at least of the plurality of lines.

2. The foldable display device of claim 1, wherein the plurality of lines includes a ground line disposed along the display area in the non-display area,
   wherein the antistatic member is connected to the ground line.

3. The foldable display device of claim 2, wherein the plurality of touch electrodes include a bridge electrode and a sensing electrode, and
   wherein the touch sensing unit includes:
   a touch buffer layer disposed on the encapsulation portion;
   the bridge electrode disposed on the touch buffer layer;
   a touch interlayer insulating layer disposed on the bridge electrode; and
   the sensing electrode disposed on the touch interlayer insulating layer.

4. The foldable display device of claim 3, wherein the antistatic member includes a same material as the sensing electrode.

5. The foldable display device of claim 3, further comprising:
   a driving circuit unit disposed on the substrate in the pad area and connected to the ground line,
   wherein the plurality of lines further includes a first touch line electrically connecting the touch sensing unit and the driving circuit unit.

6. The foldable display device of claim 5, wherein the first touch line is disposed on the touch buffer layer and the touch interlayer insulating layer in the non-display area.

7. The foldable display device of claim 5, wherein the first touch line includes a same material as the sensing electrode.

8. The foldable display device of claim 5,
   wherein the plurality of lines further includes a second touch line electrically connected to the first touch line and disposed between the substrate and the first planarization layer in the bending area.

9. The foldable display device of claim 8, wherein the first planarization layer includes a first opening connecting the first touch line and the second touch line,
   wherein the second planarization layer includes a second opening overlapping the first opening, and
   wherein the first touch line and the second touch line are in direct contact through the first opening and the second opening.

10. The foldable display device of claim 8, wherein the thin film transistor includes,
    an active layer disposed on the substrate;
    a gate electrode disposed on the active layer and insulated from the active layer;
    a source electrode and a drain electrode connected to the gate electrode,
    wherein the second touch line includes a same material as the source electrode and the drain electrode.

11. The foldable display device of claim 8, further comprising a connection electrode disposed between the first planarization layer and the second planarization layer in the display area and connected to a drain electrode of the thin film transistor,
    wherein the plurality of lines further includes an intermediate line disposed between the first planarization layer and the second planarization layer in the bending area and formed of the same material as the connection electrode.

12. The foldable display device of claim 5, further comprising a micro-coating layer disposed on the antistatic member in the bending area.

13. The foldable display device of claim 1, further comprising a cover window disposed on the touch sensing unit in the display area.

14. The foldable display device of claim 13, further comprising:
    a housing structure including a sidewall covering the bending area of the substrate in a state where the bending area is bent; and
    a housing decoration extending from the sidewall, covering an edge of the cover window, and spaced apart from an edge of the cover window.

15. The foldable display device of claim 14, wherein the sidewall is spaced apart from the antistatic member.

16. The foldable display device of claim 5, further comprising a protective layer covering the touch sensing unit in the display area and covering the first touch line in the non-display area.

17. The foldable display device of claim 9, further comprising a protective layer disposed on the second planarization layer and overlapping the second opening when viewed in a direction perpendicular to the substrate.

18. The foldable display device of claim 12, wherein the micro-coating layer covers an end of the first touch line.

19. The foldable display device of claim 5, wherein the antistatic member and the first touch line are spaced apart from each other by a jump area.

20. The foldable display device of claim 6, wherein the first touch line contacts a portion of an upper surface of the second planarization layer at the point where the touch interlayer insulating layer terminates.

21. The foldable display device of claim 12, wherein the micro-coating layer covers a portion of the driving circuit unit.

* * * * *